Jan. 26, 1960     H. A. GOTTSCHALL ET AL     2,922,832
BATTERY END CAP AND METHOD OF MAKING SAME
Filed Nov. 30, 1956

INVENTOR.
HERBERT A. GOTTSCHALL
BY HENRY S. ZABLOCKI

Leonard H. King
AGENT

United States Patent Office 2,922,832
Patented Jan. 26, 1960

2,922,832

BATTERY END CAP AND METHOD OF MAKING SAME

Herbert A. Gottschall and Henry S. Zablocki, Nutley, N.J., assignors to Myron A. Coler, Scarsdale, N.Y.

Application November 30, 1956, Serial No. 625,452

5 Claims. (Cl. 136—133)

This invention relates to conductive plastic end caps, particularly suited for use in all plastic encased battery cells.

In U.S. Patent 2,684,397, there is described a method of encasing batteries which employ cylindrical insulator plastic wall members and conductive plastic end caps sealed to the cylindrical insulator. It has been found that the permeability of the conductive plastic end caps of the assembled batteries can be materially reduced by inducing flow in the central part of the caps during assembly. It is important to reduce permeability since a major cause of deterioration of the battery cell in storage has been loss of water vapor through the plastic.

Briefly stated, one embodiment of this invention uses a thermal insulator piston, provided with a small depression, to apply pressure to a conductive plastic end cap. The end cap is simultaneously heated to its flow point by induction heating means, so as to cause flow of portions of the conductive plastic cap into said depression.

It is an object of this invention to provide an improved conductive plastic battery end cap.

It is another object of this invention to provide a method of making improved plastic encased batteries.

A specific object of this invention is to provide a conductive plastic battery end cap of low vapor permeability.

Other objects and advantages of the invention will become apparent as the description proceeds in conjunction with the accompanying drawings.

Figure 1:
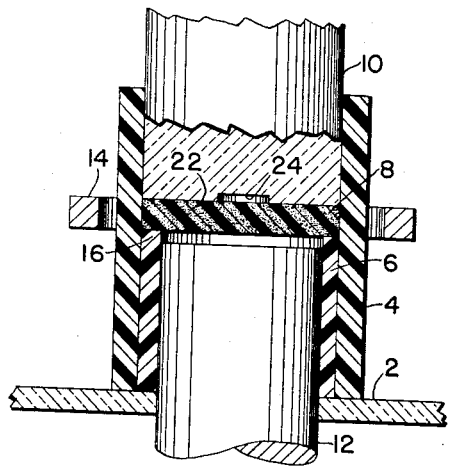
Figure 1 shows in cross-section, elements of a battery cell and apparatus for comolding said elements.

Referring now to the drawings:

In Figure 1 there is shown an asbestos board supporting base 2. Mounted thereon is a phenolic resin retaining cylinder 4. Inserted within the retaining cylinder 4 are a thermoplastic insulator plastic tube 6 and a thermoplastic conductive plastic cap 8. Upper piston 10 is preferably formed of glass. The piston is positioned against the conductive plastic cap 8, while lower piston 12 is maintained at a level about 1/16" to 1/8" below the cap.

Heat is generated in cap 8 by means of high frequency electromagnetic energy transmitted by the induction coil 14. The cap being formed of a thermoplastic resin softens. The top region 16 of insulator cylinder 6 is in turn softened by heat transmitted by conduction from the cap 8. Since piston 12 is spaced away from the cap 8, pressure from piston 10 causes the cylinder in region 16 to deform inwardly while the conductive plastic cap 8 is forced to flow around the deformation to form the interlocking seal 20 shown in Figure 2.

Simultaneously, the upper surface 22 of the cap 8 is caused to flow so that cap material fills depression 24 in piston 10.

Figure 2:
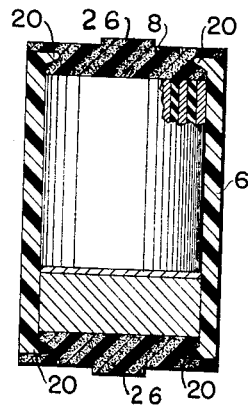
Figure 2 shows in cross-section the resulting molded plastic products incorporated into a battery.

The resulting molded button-like protrusion 26 is shown in Figure 2.

In a typical application, a polystyrene tube ½ inch long and having a ⅝ inch diameter and a 1/10 inch wall was sealed to a 1/16 inch thick conductive thermoplastic disc; a glass piston 10 was provided with a depression 24 approximately ¼ inch in diameter and 0.60 inch deep. As is disclosed more fully in the referenced patent, the resulting "cup" is inverted, filled with an electro-chemical system and an end cap sealed on to the cylinder in the same manner to encapsulate the unit.

Figure 3:
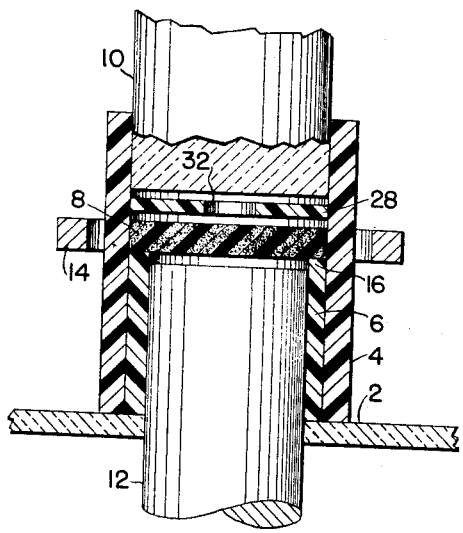
Figure 3 shows in cross-section, an alternative embodiment of this invention positioned in a molding apparatus.

In Figure 3 there is shown an alternate embodiment of this invention wherein an insulator plastic disc 28 is sandwiched between cap 8 and piston 30. Piston 30 is provided with a flat bottom surface. Washer 28, preferably made of the same plastic as insulator plastic cylinder 6, is molded to the end cap 8 simultaneously with the molding of the end cap 8 and cylinder 6. Flow of conductive plastic from the cap 8 takes place into the hole 32 in the washer 28.

Figure 4:
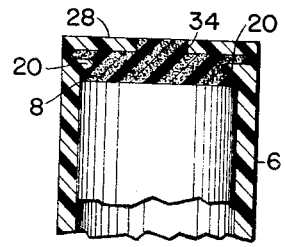
Figure 4 shows in cross-section, the alternative embodiment of Figure 3 after molding.

In the latter instance, a battery cap is provided, as shown in Figure 4, which has a button-like projection 34 on its electrode end which is surrounded by insulator plastic 8 to provide a flush surface. For some applications washer 28 may be made of conductive plastic so as to provide a greater contact-making area.

Cells made as described herein with button-like projections on the end caps have been tested by storage at 130° F. for 12 months after which they showed traces of efflorescence of alkali at the anode end of the cells. Cells made with flat end caps showed similar efflorescence after only 3 months of storage at 130° F.

As employed herein the terms "conductive" and "insulator" refer to electrical properties.

Having thus disclosed what is currently considered to be the best mode for carrying out our invention, we wish it to be understood that various modifications may be made by those skilled in the art without departing from the spirit of our invention.

What is claimed is:

1. The method of sealing a preformed electrically conductive thermoplastic member to a tubular insulator plastic member including the step of heating at least the surface of said preformed conductive thermoplastic member to at least the softening point of said thermoplastic and applying pressure to the resulting softened thermoplastic surface by means including a recess so as to cause at least a portion of said softened thermoplastic to flow into said recess.

2. The method of reducing the water vapor permeability of a molded electrically conductive thermoplastic member comprising internally heating the body of said member to a temperature sufficient to permit flow of the plastic and to heat the surface of said member to at least its softening point by heat transmitted internally to the surface, applying pressure to the resulting softened thermoplastic surface by piston means provided with a recess and causing a flow of at least a portion of said thermoplastic member so as to fill the recess.

3. The method of claim 2 wherein said internal heating is produced by electromagnetic induction.

4. The method of reducing the water vapor permeability of a molded electrically conductive thermoplastic member comprising positioning an insulator plastic member having a recess in juxtaposition with said electrically conductive member, internally heating the body of said member to a temperature sufficient to permit flow of the plastic and to heat the surface of said member to at least its softening point by heat transmitted internally to the surface, applying sufficient pressure to said insulator plastic member and said heated electrically conductive member to simultaneously bond them and cause a flow of at least a portion of said thermoplastic member so as to fill the recess.

5. The method of claim 4 wherein said internal heating is produced by electromagnetic induction.

References Cited in the file of this patent

UNITED STATES PATENTS

| | | |
|---|---|---|
| 1,904,845 | Zelenra | Apr. 18, 1933 |
| 2,016,568 | Zinser | Oct. 8, 1935 |
| 2,041,518 | Saly | May 19, 1936 |
| 2,432,668 | Kingston | Dec. 16, 1947 |
| 2,526,311 | Wilson | Oct. 17, 1950 |
| 2,572,017 | Ellis | Oct. 23, 1951 |
| 2,684,397 | Gottschall | July 20, 1954 |
| 2,722,719 | Altstadter | Nov. 8, 1955 |
| 2,723,301 | West et al. | Nov. 8, 1955 |
| 2,767,436 | Noland et al. | Oct. 23, 1956 |